July 22, 1941.  J. T. KELLY  2,250,199
COUPLING
Filed Aug. 14, 1940
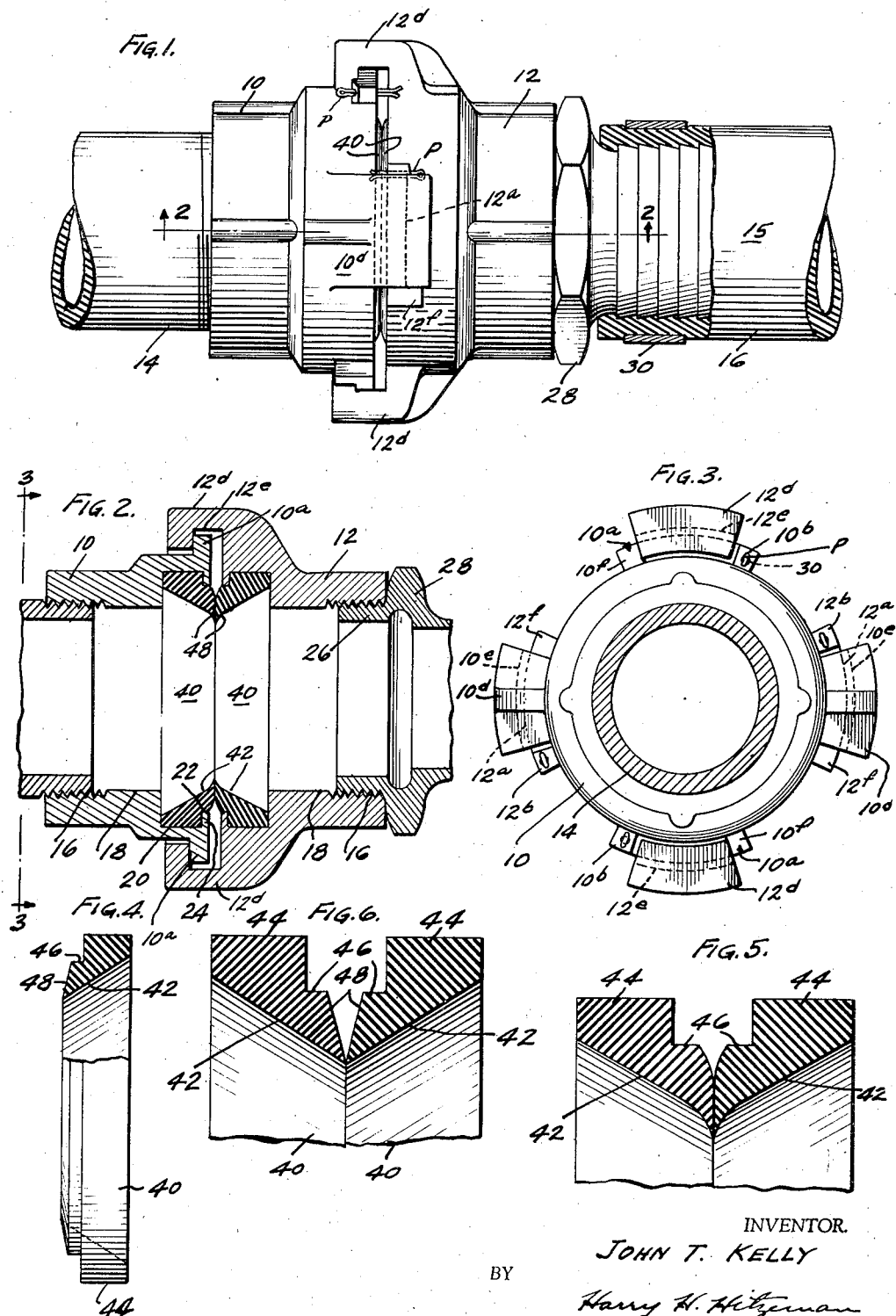
INVENTOR.
JOHN T. KELLY
BY
Harry H. Hitzeman
ATTORNEY.

Patented July 22, 1941

2,250,199

UNITED STATES PATENT OFFICE 2,250,199

COUPLING

John T. Kelly, Chicago, Ill.

Application August 14, 1940, Serial No. 352,534

2 Claims. (Cl. 285—63)

My invention relates to improvements in couplings and similar devices.

My invention relates more particularly to couplings capable of use for separable connecting together sections of lengths of hose or pipe. The coupling means which I am particularly referring to are couplings for flexible hose or rigid conduits of the class generally known as "Universal type," which are generally formed of a pair of half couplings provided with interconnecting ears and shoulders which cooperate so that they may be easily and quickly connected together or easily and quickly disconnected by a slight rotary turning movement of the parts.

The principal object of the present invention is to provide an improved coupling means of the type described, capable of easy and quick connection or disconnection which, when connected together forms an absolutely sealed joint between separable sections of pipe or hose.

A further object of my invention is to provide an improved coupling member of the type described provided with improved co-operating sealing gaskets for accomplishing an absolute seal between separable sections of pipe or hose.

One of the principal objections to gaskets of the type now on the market and used somewhat extensively is the fact that these gaskets all have a flat co-operating seating surface and are approximately as thick at the inner diameter as at the outer. With this type of gasket an operator can with the use of considerable strength compress the gaskets sufficiently to lock the coupler members together in coupler sizes up to 1-inch hose. In couplers for hose larger than one inch, the strength required to compress the gaskets is correspondingly greater and the gaskets cannot be compressed by hand so that it is necessary to place one hose section in a vise to couple to another. This, of course, is not desirable, as the hose sections are frequently used where no vises are available, and in addition the quick-coupling feature is destroyed. The improved gasket which I have provided may be used for large or small size couplings and may be easily put together and always provides a perfect seal. This is accomplished by reason of the shape of facing portions of the gaskets and the cross-sectional design which permits the flexibility for easy connection or disconnection of the couplings and at the same time permits the pressure in the line to assist in keeping a fluid-tight seal.

A further object of the present invention is to provide an easily separable or connected coupling means which may be easily and quickly locked against disconnection.

Locking means have been provided in the past for coupling members of this type. One of those in use provides coupling members having interlocking ears which have extensions that lie alongside each other and are formed with holes which are aligned so that a pin or nail can be pushed through the two holes thus locking the couplings together. Since the usual couplings made this way are castings with no machining except the drilling of the holes, the holes do not always align, and as a result no pin or nail can be passed through the two holes to lock the couplings together. One of the features of my construction is to provide a locking means between the interlocking ears which avoids the nicety of the above mentioned construction.

A further object of the present invention is to provide an improved construction of coupling members wherein identical connecting heads are locked together in such manner that a simple securing means, such as a cotter pin, nail or similar device may be utilized to prevent unauthorized unlocking of the same, by passing said pin or nail through only one of the connecting heads.

A further object of the present invention is to provide an improved pipe or hose coupling for easy and quick connection between separable sections of pipe or hose that is comparatively simple in construction, cheaply manufactured, yet one which will be capable of long wear and hard use without becoming broken or out of order.

Other objects and advantages will be more apparent from the following description wherein reference is had to the accompanying sheet of drawings upon which Fig. 1 is a side elevational view of the complementary coupler members one of which is attached to a rigid pipe and the other of which is attached to a flexible hose;

Fig. 2 is a longitudinal sectional view thereof taken generally on the line 2—2 of Fig. 1.

Fig. 3 is a cross-sectional view thereof taken generally on the line 3—3 of Fig. 2;

Fig. 4 is a side elevational view of one of the sealing gaskets with a portion thereof broken in section; and Fig. 5 is an enlarged diagrammatic view of the complementary gasket members shown in the sealing position which they assume when a pair of pipe or hose sections are joined together.

Fig. 6 is an enlarged view of the complementary gasket members shown before the pipe sections have been joined together.

In the embodiment of the invention which I have chosen to illustrate, I have shown a pair of coupling members 10 and 12 connected to a rigid pipe section 14 and a flexible hose section 15 respectively. Both the coupling members 10 and 12 may be formed with similarly tapped openings 16 communicating with annular bores 18. The annular bore 18 may communicate with a larger bore 20 which extends for a distance and terminates in a reduced cylindrical opening 22 formed by the provision of the ledge member 24. The coupling 10 is adapted to receive the threaded end of the rigid pipe 14 and the coupling 12 is adapted to receive the threaded end 26 of a connector member 28 to which the flexible hose member 15 may be fastened by clamp means 30.

The coupling member 10 may be formed with a pair of arcuately disposed ear sections 10a about its outer periphery. Each of the ear portions 10a is formed with a raised portion 10b and a stop portion 10f for a purpose which will be hereinafter described. The coupler member 12 is provided with similar ear portions 12a which are formed with a raised portion 12b and a stop portion 12f, in a manner identical to the ear portions of the coupler member 10. The coupler member 10 is formed with a pair of shoulder portions 10d having an undercut arcuate parallel sided slot portion 10e adapted to overlie the ear portions 12a of the coupler member 12. The coupler member 12 is formed with similar ear portions 12d formed with the undercut parallel sided slots 12e adapted to overlie and engage the ear members 10a of the coupler member 10. By the provision of the similarly shaped ears and overlying shoulder portions upon the coupler members 10 and 12 it will be seen that the couplers can easily be clamped together by a slight rotary movement and connect against the stop portions 10f and 12f.

The raised portions 10b and 12b are each provided with drilled openings 30 for the reception of a pin, nail or cotter pin P so that when the couplers are connected and cotter pins are inserted, counterclockwise rotary movement will not separate the couplers.

It will be understood, of course, that the coupling members are locked into position when the raised portions 10b and 12b clear the edge of the shoulders 10d and 12d. In this position and during use the couplers are further held against relative counterclockwise movement by the pressure of the fluid in the line. However, for use over a period of time or when the line is moved about considerably, it is desirable to provide a positive locking means such as a pin or nail through one of the openings 30.

In order to provide an air tight seal between the connected hose or pipe sections and their respective couplers, I have provided the flexible gasket members 40. As shown in Fig. 4, the gasket member 40 is formed with a frusto-conically shaped bore 42, a cylindrical outer edge 44, a reduced shoulder 46 and a tapered meeting edge 48. With the construction shown the coupling members are adapted to fit into the enlarged bores 20 of the couplers and extend beyond the edges of the ledges 24.

When a pair of coupling members are connected together, as shown in Fig. 1, it is necessary to compress the arcuately disposed meeting edges 48 in the manner shown in Fig. 5. This does not require much effort in view of the comparatively thin meeting edge present and by reason of the tapered edges 48 and the internal bore 42 of the gaskets. Therefore, the couplers are easily connected together and when fluid under pressure is transmitted through the couplings, the fluid bearing against the inner edges of the gaskets has a tendency to press the same together more tightly, thereby creating a seal of sufficient strength for any desired pressure. The seal, obviously, will depend upon the pressure of the fluid which is passing through the coupler. The greater the pressure the more tight the seal will be.

From the foregoing description it should be apparent that the gasket which I have shown and described by reason of its cross sectional area and the tapered face shape gives the desired flexibility so that the coupling members can be easily pressed together in spite of the size. Furthermore, by reason of the tapered faces the sealing action which is obtained is positive and absolutely prevents leakage of fluid in the seal. In its final seating position the pressure of the fluid passing through the line will naturally assist in making the seal even more perfect.

From the above and foregoing description it will be apparent to those skilled in the art that changes and modifications may be made in the exact details shown. It will be obvious that instead of the cotter pins P, nails, spring-pressed plungers or any other type of locking means may be provided in the shoulders 10b and 12b. I contemplate that changes and modifications may be made in the exact details shown and I do not wish to limit myself in any particular. Rather what I desire to secure and protect by Letters Patent of the United States is:

1. The combination with a pair of coupler members having radially inwardly extending flanges forming end walls for cylindrical recesses in their opposing ends, of similarly shaped gaskets in each recess, each of said gaskets in the form of a ring having a cylindrical outer surface and a tapered bore, each of said gaskets having a reduced cylindrical portion fitting through the end wall of said recess and tapered meeting edges adapted to be pressed against each other to be deformed from a line meeting edge to have a ring surface contact area when said coupler members are connected together.

2. A coupling comprising a pair of identical coupler members, each of said members having similarly shaped cylindrical grooves in their meeting ends, a radial inwardly extending flange with a circular opening therein forming the end wall of each of said recesses, a pair of gaskets seated in said recesses and having portions extending beyond the edges of said flanges to provide when assembled an air-tight fit between said coupler members, each of said gaskets in the form of a ring having a cylindrical outer surface and a tapered bore, each of said gaskets having a reduced cylindrical portion fitting through the opening formed by the end walls of said coupler members and tapered meeting edges adapted when pressed against each other to be deformed to increase the area of surface contact, a pair of ears and a pair of shoulders on each of said coupler members, the shoulders of each member adapted to overlie the ears of the other coupler member to lock said members together by a clockwise rotary movement of one of the same, said ears and shoulders providing a flat seating surface between said coupler members.

JOHN T. KELLY.